Aug. 5, 1924.
E. J. BREWSTER ET AL
1,503,472
ROD BRASS
Filed Nov. 19, 1923   2 Sheets-Sheet 1
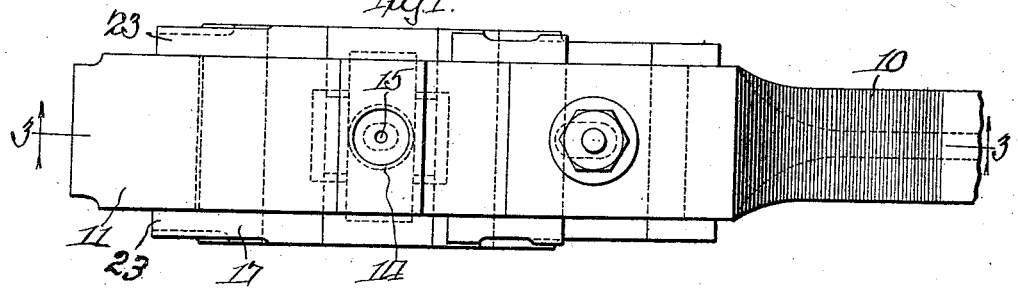

Aug. 5, 1924.  
E. J. BREWSTER ET AL  
ROD BRASS  
Filed Nov. 19, 1923  
1,503,472  
2 Sheets-Sheet 2
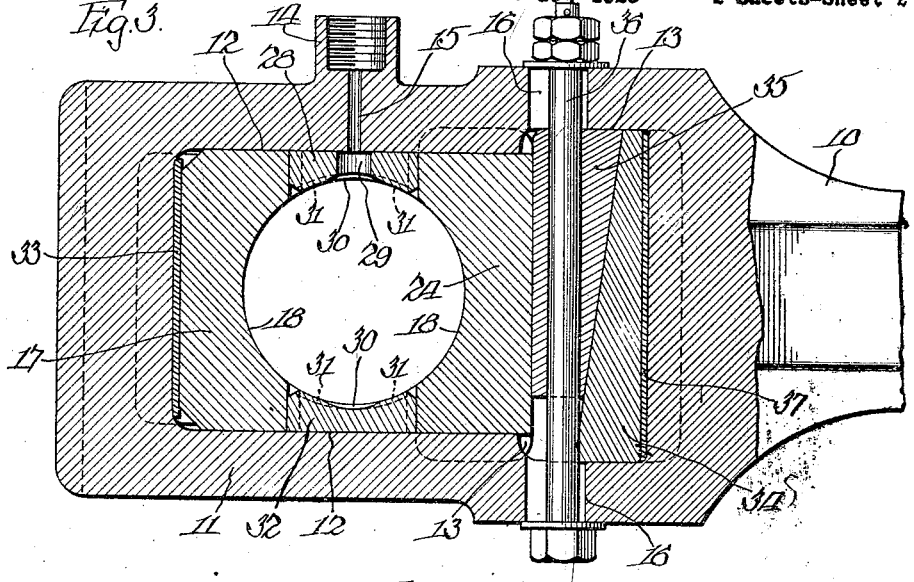
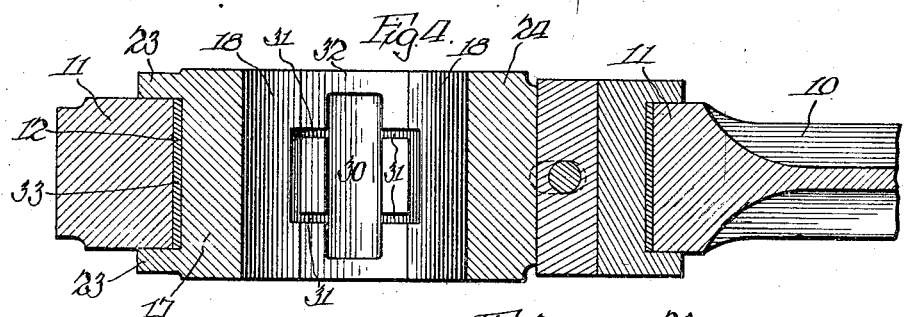
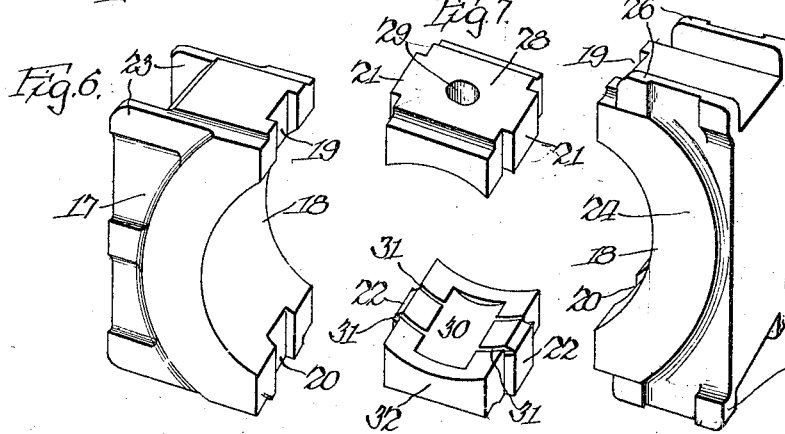
Inventors,  
Elmer J. Brewster  
and John Murrin  
By Chas. C. Tillman  
atty.

Patented Aug. 5, 1924.

1,503,472

UNITED STATES PATENT OFFICE.

ELMER J. BREWSTER AND JOHN MURRIN, OF CHICAGO, ILLINOIS.

ROD BRASS.

Application filed November 19, 1923. Serial No. 675,528.

*To all whom it may concern:*

Be it known that we, ELMER J. BREWSTER and JOHN MURRIN, citizens of the United States, residents of Chicago, in the county of Cook and State of Illinois, have jointly invented certain new and useful Improvements in a Rod Brass, of which the following is a specification.

This invention relates, generally, to bearings, but has particular relation to that type of bearings known as "rod brasses," which are carried by rods at one of their ends for co-operation with or for providing bearings for eccentric or wrist-pins on parts or wheels to be driven by said rods, and while the invention is shown in the accompanying drawings embodied in the rod brass of a main rod of a locomotive, and will be hereinafter described and explained in connection with such a rod, yet, we wish it to be distinctly understood that we do not limit ourselves in its application thereto, but may use it in connection with other kinds of rods or elements, or wherever it may be found applicable, without a departure from the spirit of the invention.

The invention contemplates as one of the objects thereof, the provision of a rod brass of such construction and arrangement of its parts as to greatly increase its efficiency and durability over those now commonly in use, by providing means whereby uneven binding action or stress of the brass on the pin which it surrounds, incident to the contraction and expansion of the brass, will be greatly diminished if not eliminated and all expanding and contracting strain will be equalized.

Another object is the provision of a rod brass consisting of a plurality of interengaging and independently movable pieces in excess of two pieces, each of which pieces shall have an arcuate surface for contact with the pin, limited in arcual extent to such a degree that in the contraction towards each other of the opposed end portions of each of said surfaces the gripping or binding effect thereof on the pin will be reduced to a minimum, thereby distributing or equalizing the frictional stress of the brass around and on the periphery of the pin.

A further object of the invention is, to furnish a brass of such construction and arrangement of its parts as to simplify and economize in time, labor and expense in closing or assembling and fitting the brasses.

Still another object is the provision of means for the constant and thorough lubrication of the entire frictional surfaces of the brass and its pin.

Furthermore, another object is to provide means whereby cutting of the brass at suitable points to adjust its parts to the pin after becoming worn from usage, can be more quickly and readily accomplished and with less labor and expense than ordinarily.

Other objects and advantages of the invention will become apparent from the following description and explanation, which will be more readily understood when read in conjunction with the accompanying drawings, in which an embodiment of which the invention is susceptible is illustrated, it being understood that changes and modifications therein may be resorted to without a departure from the invention, so long as they fall within the scope of the appended claims forming a part hereof.

In the drawings,—

Fig. 1 is a plan view of a portion of a main rod of a locomotive equipped with a rod brass constructed according to our invention.

Fig. 2 is a side view thereof.

Fig. 3 is a vertical sectional view taken on line 3—3 of Fig. 1 looking in the direction indicated by the arrows.

Fig. 4 is a horizontal sectional view taken on line 4—4 of Fig. 2 as indicated by the arrows.

Fig. 5 is a perspective view of the front section of the brass.

Fig. 6 is a similar view of the inner surface of the rear or back section.

Fig. 7 is a like view of the top section, and

Fig. 8 is a plan perspective view of the bottom section of the brass.

Corresponding numerals of reference refer to like parts throughout the different views of the drawings.

Referring now more particularly to Figs. 1 to 4 inclusive of the drawings, the reference numeral 10 designates a portion of a main rod of a locomotive, which is provided at one of its ends with a substantially rectangular frame which is designated as a whole by the reference numeral 11, which frame is known in the trade as a "strap" for the brass. As shown, the cavity or opening 12 of the frame or strap is elongated longitudinally with respect to the rod 10 and has its front portion 13 of greater depth than the balance thereof for the purpose to be presently explained. The upper portion of the strap 11 is provided near its longitudinal middle with a grease cup 14 which has communication through an opening 15 with the cavity 12 for the passage of grease employed for lubricating the parts of the brass and eccentric or wrist-pin around which the brass is mounted. The front portion of the strap 11 is provided at the rear portion of the enlarged part 13 of its cavity with elongated openings 16 one of which is located in the upper part of the strap and the other in alignment therewith in the lower part of the same.

Located in the rear portion of the frame is the rear or back section 17 of the brass, which as is clearly shown in Figs. 3, 4 and 6 of the drawings, is provided with a forwardly facing arcuate surface 18 which is of about one-fourth of a circle in extent, to embrace or contact with the wrist-pin for which the brass is intended, the said pin being omitted from the drawings for the sake of clearness. The front face of the section 17 is provided at its upper and lower portions with recesses 19 and 20 respectively for interlocking engagement with projections 21 and 22 on the rear surfaces of the top and bottom sections respectively of the brass, which grooves and projections, it will be understood, are of corresponding shapes to afford interlocking engagement between the section 17 and the said top and bottom sections, yet so that said parts may have individual or independent movements. At each of its sides the section 17 is provided with a rearwardly extended vertically disposed flange 23 which are spaced in parallelism so as to stride the rear upright wall of the cavity 12 of the strap so as to be held thereby against lateral displacement.

The front section of the brass is designated as a whole by the numeral 24 and has its rear face provided with an arcuate surface 18 preferably of the same dimensions as the arcuate surface 18 of the section 17, and is provided with recesses 19 and 20 at the upper and lower portions respectively of its rear face to movably interlock with projections 21 and 22 on the adjacent faces of the top and bottom sections of the device, by which arrangement it is evident that said members will be held against lateral displacement but will have independent or individual movements.

The upper end of the front section 24 is provided with a pair of spaced flanges 26 to engage the upper rail or portion of the frame 11 and the lower end of said section is provided with a pair of spaced flanges 27 for engagement with the lower rail or portion of the frame so as to prevent lateral displacement of said section.

The top section is designated as a whole by the reference numeral 28 and as before stated, has on its front and rear portions projections 21 to engage the recesses 19 in the adjacent upper portions of the front and rear sections respectively. The section 28 is provided centrally with an opening 29 to coincide with the opening 15 of the frame and has in its lower arcuate surface a chamber 30 from which lead one or more channels 31 for the passage of lubricant to the pin or journal. The bottom section 32 is a reversed counterpart of the top section 28, except that the opening 29 in the latter section is omitted from the bottom section. The arrangement of the chamber and channels leading therefrom in the top section 28 is the same as that shown in Fig. 8 except of course, that the chamber and channels of the top section are located in the lower surface thereof instead of in the upper surface as shown in the last mentioned figure.

From the foregoing and by reference to the drawing, it will be readily understood and clearly seen that in order to assemble the parts within the frame, assuming that that the same is empty, the rear or back section 17 can be inserted in the enlargement 13 and slid rearwardly on the frame until its flanges 23 at the rear wall of said section stride the rear wall of the cavity of the frame. However, before this section is placed in position, a shim 33, if desired, can be placed against the rear wall of said cavity. After the section 17 has been positioned as shown in Figs. 3 and 4 of the drawings, the top and bottom sections 28 and 32 respectively are placed so that their projections 21 and 22 will engage respectively the recesses 19 and 20 in the front portion of the section 17. After thus being arranged, the section 24 can be inserted into the enlarged part 13 of the cavity of the frame and then slid rearwardly therein, its flanges 26 and 27 acting as guides therefor, until its recesses 19 and 20 are engaged by the interlocking projections 21 and 22 of the top and bottom sections. To firmly and securely hold the sections of the brass in the positions just above mentioned, a pair of wedges 34 and 35, the latter having a longitudinal opening therethrough, is placed between the front wall of the front section 24 and the front wall of the cavity of the frame, as will be readily understood by reference to Fig. 3 of the drawings. A rod 36 may then be extended through the openings 16 in the frame and secured in position by means of nuts and washers in any usual way. If desired, another shim 37 can be interposed between the front wedge 34 and the front wall of the frame.

By our improvements, it is manifest that each of the sections comprising the brass will have independent movement towards and from the pin or member located within the circular bearing provided by the arcuate surfaces of said sections, but that they will be locked against lateral displacement by means of their interlocking recesses and projections, as well as by reason of the flanges 23 on the rear section and the flanges 26 and 27 on the front section, which flanges may be used. It is furthermore apparent that by our improvements we afford means for the easy removal and assemblage of the sections, for it is obvious that by removing the wedges, keys or other methods for holding brass in place and sliding the front section 24 forwardly, the top and bottom sections can be detached from the frame and if it is necessary to remove a portion of either of the last named sections in order to properly adjust the members of the brass to the pin, this can be done without entirely removing the front or back section from the frame.

While we have shown the brass sections enclosed in a frame integral with the main rod, yet we do not confine ourselves to such construction, as we may employ a frame of any desired style, it being understood that that shown in the drawings and above described, is employed as an example only.

Having thus fully described our invention, what we claim as new and desire to secure by Letters Patent is:

1. A rod brass consisting of a frame carried by the rod and four independently movable sections interlocking with one another and located within said frame, two of said sections being spaced from each other and arranged in longitudinal relation with respect to the said rod and the other two of said sections being spaced from one another and interposed between the adjacent surfaces of the two first named sections, each of said sections having an arcuate inner face, and said four sections having co-acting faces disposed at right angles to the planes of their outer contiguous surfaces.

2. A rod brass consisting of a frame carried by the rod and four independently movable sections interlocking with one another and located within said frame, two of said sections being spaced from each other and arranged in longitudinal relation with respect to the said rod and the other two of said sections being spaced from one another and interposed between the adjacent surfaces of the two first named sections, each of said sections having an arcuate inner face, and said four sections having co-acting faces disposed at right angles to the planes of their outer contiguous surfaces, whereby the inward movement of the said longitudinally arranged sections will have no effect on the said interposed sections as to their inward movement.

3. In a device of the class described, the combination with a frame having communication at its upper portion with a supply of lubricant, of a brass consisting of a front and back section and a top and bottom section interposed between the first named sections located within said frame, all of said sections interlockingly engaging one another but each having independent movement and each section having an arcuate inner surface arranged for co-operation with one another to form a bearing, said top section having an opening there-through for communication with a supply of lubricant and on its inner surface a chamber for the reception of lubricant, and provided on its inner surface with channels leading from said chamber, said bottom section having a chamber in its upper or inner surface and provided with channels leading from said chamber, and means co-operating with one end of said frame and the outer surface of the front section for detachably securing the sections within the frame.

4. In a device of the class described, the combination with a frame having communication with a supply of lubricant, of a brass consisting of a front and back section and a top and bottom section interposed between the first named sections located within said frame, all of said sections interlockingly engaging one another but each having independent movement and each section having an arcuate inner surface arranged for co-operation with one another to form a bearing, one of said sections having an opening therethrough for communication with the supply of lubricant and on its inner surface a chamber for the reception of lubricant and provided with means for the passage of lubricant on each of the sides of said chamber, another of said sections having a chamber in its inner surface and provided with means leading from said chamber for the passage of lubricant, and means co-operating with one end of said frame and the outer surface of the front section for detachably securing the sections within the frame.

ELMER J. BREWSTER.
JOHN MURRIN.